July 30, 1940. G. H. ROEDER 2,209,613
DECOMPOSITION OF ORGANIC MATTER
Filed April 29, 1935 4 Sheets-Sheet 1

INVENTOR
George H. Roeder
BY Paul R Ames
ATTORNEY

July 30, 1940.    G. H. ROEDER    2,209,613
DECOMPOSITION OF ORGANIC MATTER
Filed April 29, 1935    4 Sheets-Sheet 2

INVENTOR
George H. Roeder
BY Paul R. Ames
ATTORNEY

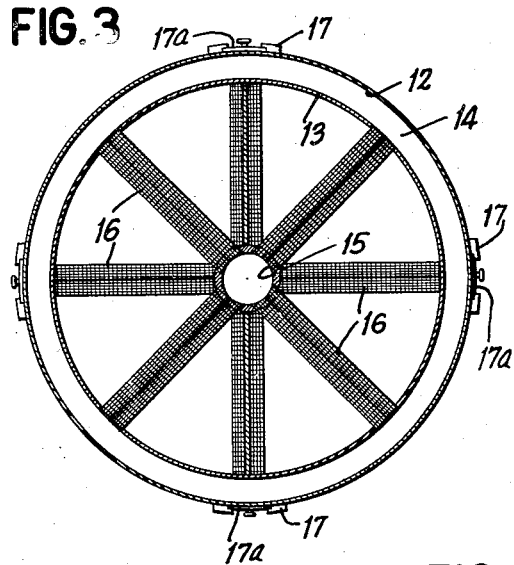
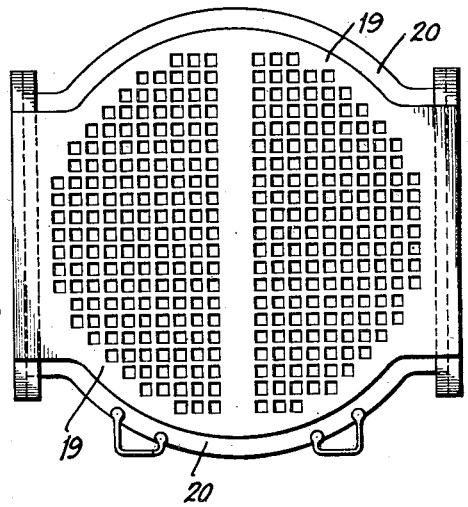
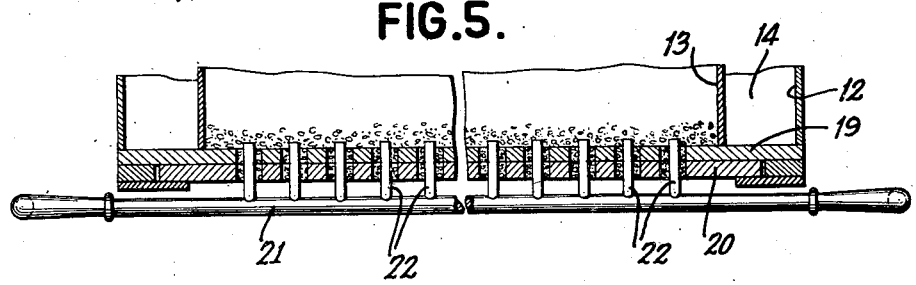
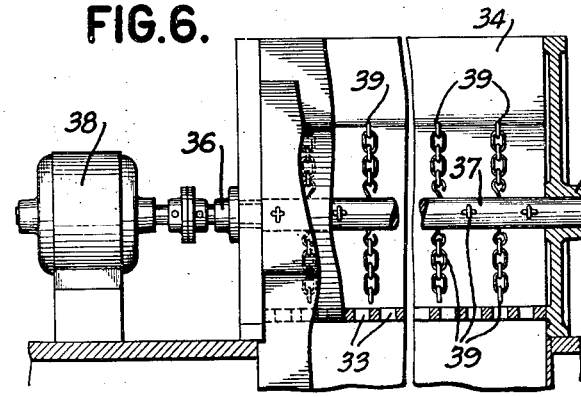
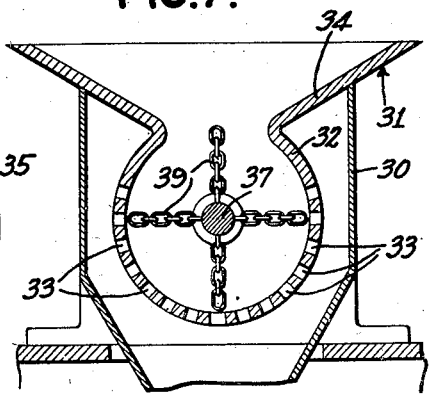

July 30, 1940.  G. H. ROEDER  2,209,613
DECOMPOSITION OF ORGANIC MATTER
Filed April 29, 1935   4 Sheets-Sheet 4
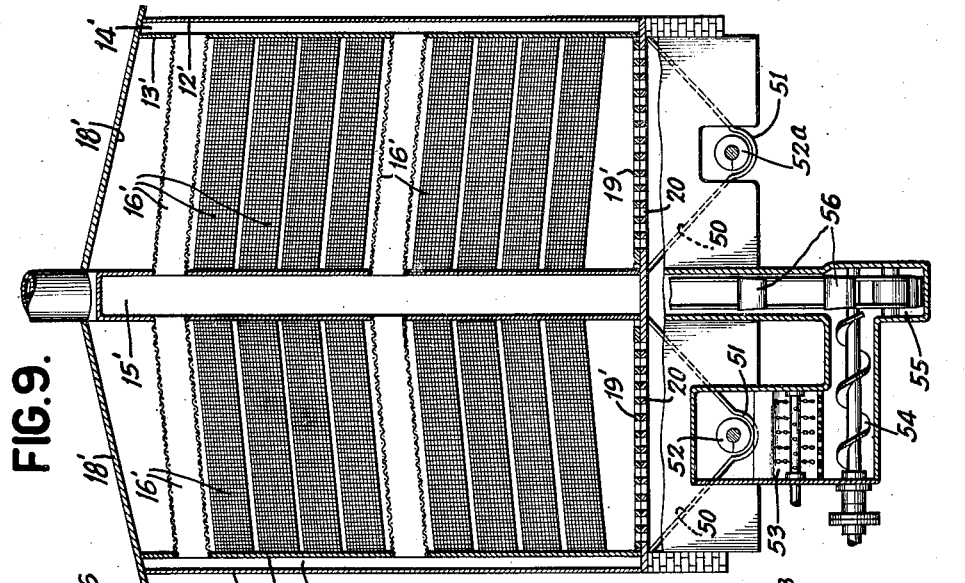
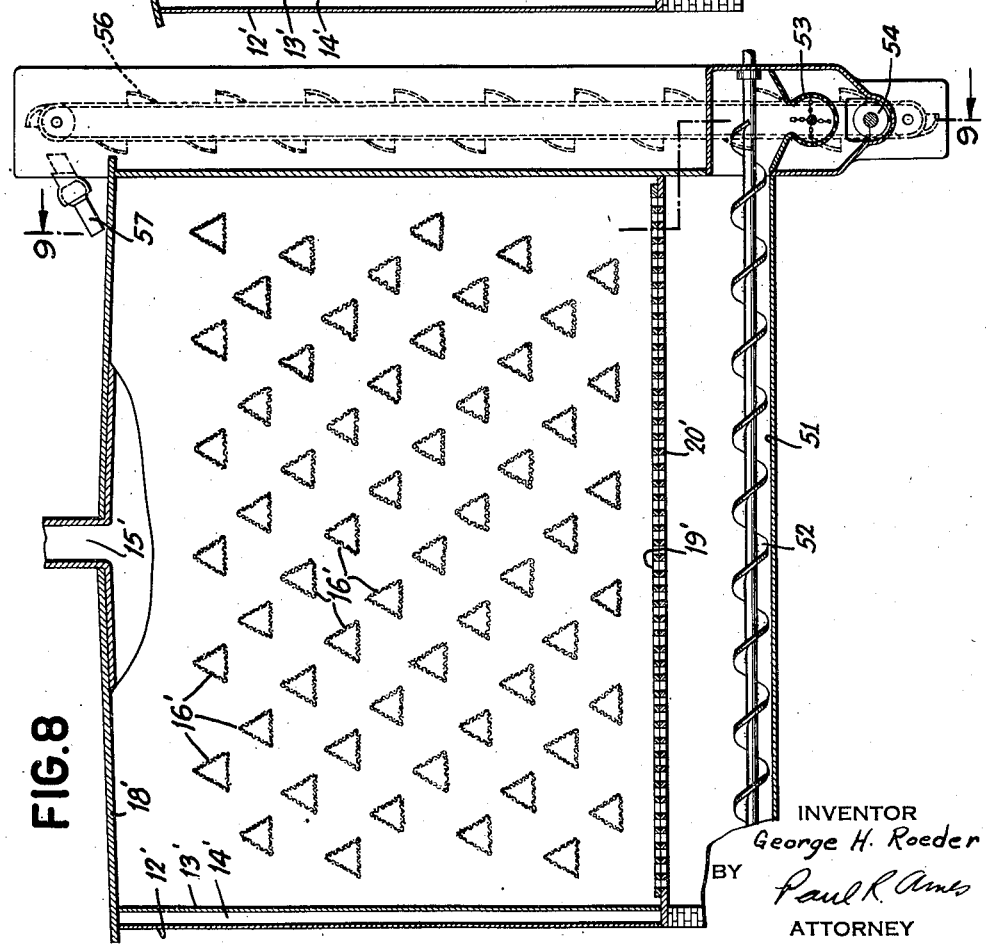
INVENTOR
George H. Roeder
BY
Paul R. Ames
ATTORNEY Patented July 30, 1940

2,209,613

UNITED STATES PATENT OFFICE 2,209,613

DECOMPOSITION OF ORGANIC MATTER

George H. Roeder, Brooklyn, N. Y., assignor to Bio Reduction Corporation, Brooklyn, N. Y., a corporation of New York Application April 29, 1935, Serial No. 18,787

13 Claims. (Cl. 210—2)

This invention relates to a process of and apparatus for stabilizing and digesting decomposable organic matter, more particularly domestic and industrial organic wastes, with the aid of the thermophilic micro-organisms already in the material, and to the product obtained thereby.

An object of the invention is to convert such decomposable organic matter into a product having valuable properties. It is also an object to produce such a product which may be employed in treatment of other undecomposed organic matter and one which may be useful as a fertilizing material. Another object is the production of improved products having valuable properties for use as a filter aid, a filtering material, or as a purifying agent as well as for various other uses.

A further object of the invention is to treat waste organic matter in such a manner that it is thoroughly decomposed while inhibiting putrefaction and micro-organic fermentation.

Another object of this invention is to produce novel apparatus to aid in carrying out the various steps of my method.

Further objects will be more apparent from the detailed description of one form of the invention as applied to sewage. It is understood, of course, that garbage and other organic wastes or mixtures thereof may be similarly treated.

My process provides a rapid and controlled decomposition of such organic wastes and, in brief, comprises the steps of agitating raw sewage mixed with some of my end product, settling and separating the solids, dewatering these solids to the right degree and stabilizing the dewatered material to a fully stable decomposed non-putrescible end product. The liquid phase may be further treated in any desired manner. It is to be understood that this treatment may be applied also to sludges obtained from any source. In this operation of my process the sludge itself is the starting point and is treated with end product, dewatered, and stabilized as more fully described below. Certain embodiments of my invention are illustrated in the drawings in which:

Figure 2:
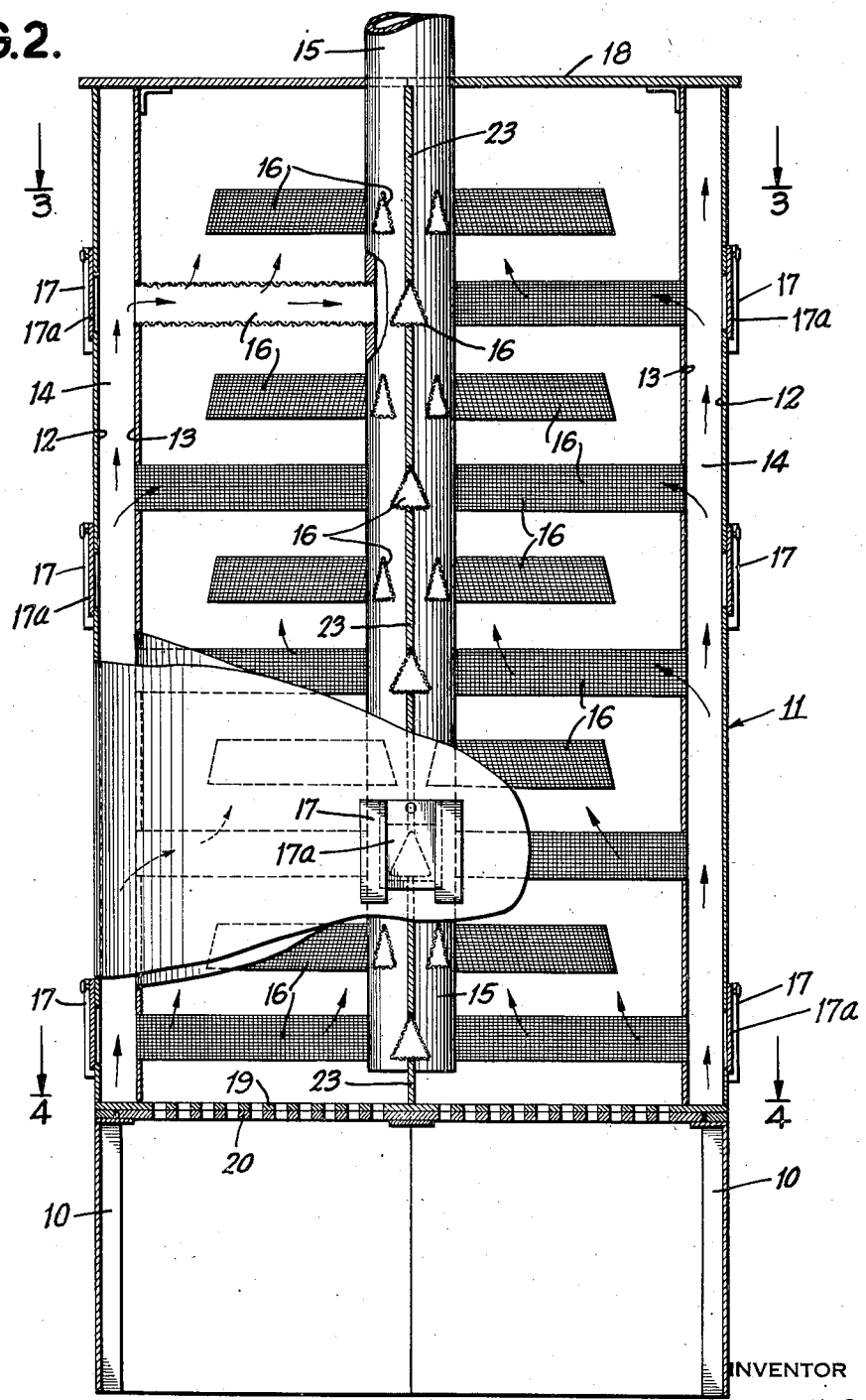
Figure 2 is a vertical cross section of one form of a stabilizing tank, which may be employed.

Figures 3 and 4 are longitudinal sections on the lines 3—3 and 4—4 respectively, of Figure 2.

Figure 5 is a vertical section of the bottom of my apparatus with the shaker mechanism in position to be used.

Figure 6 is a longitudinal view partly in section of a chain mill or disintegrator employed in connection with the stabilization treatment.

Figure 7 is a transverse section of such chain mill.

Figure 8 shows another modification of a stabilizing chamber incorporating a chain mill, and Figure 9 is a sectional view on the line 9—9 of Figure 8.

Figure 1:
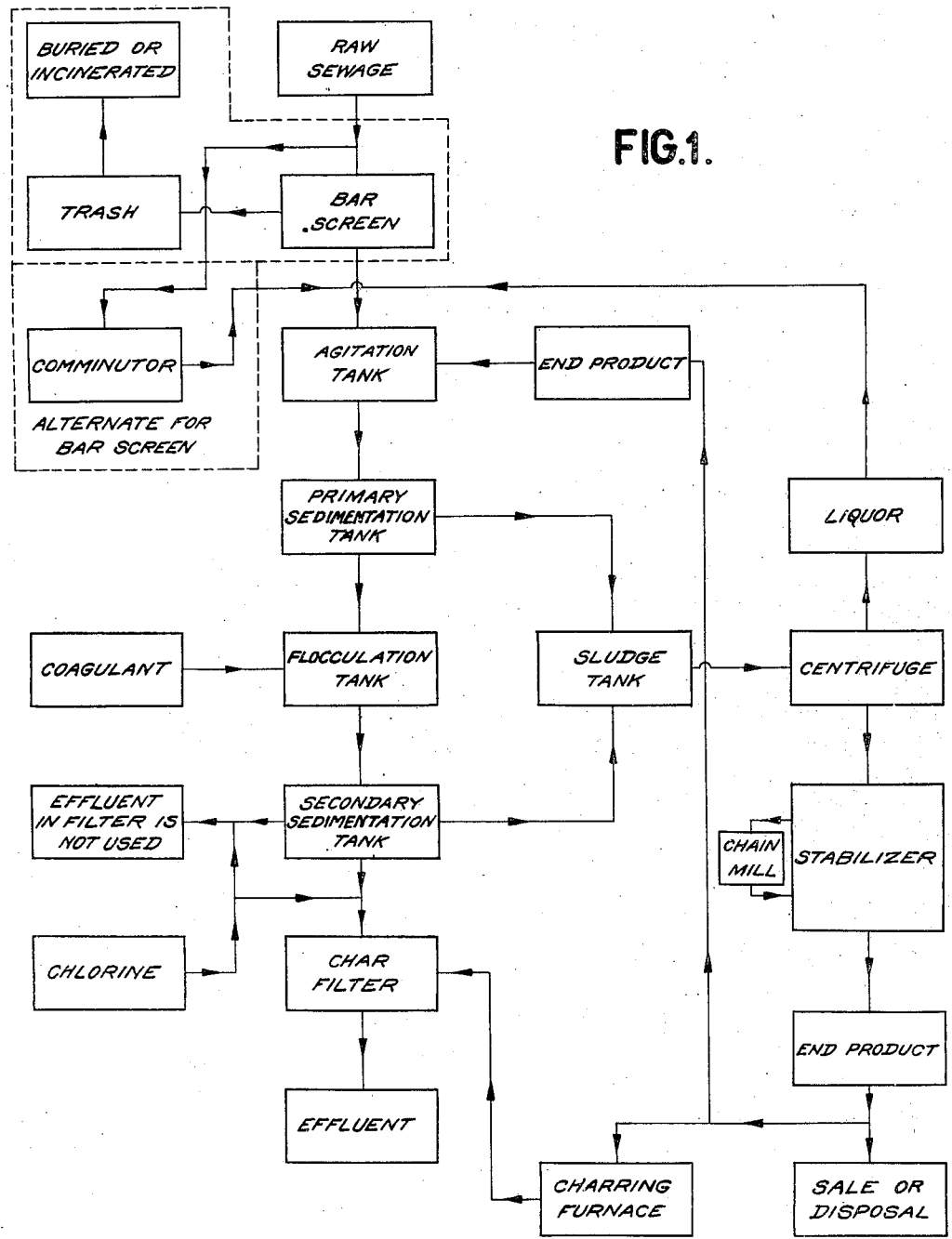
Figure 1 is a flow sheet of one commercial embodiment of my process.

Referring more particularly to Figure 1, raw sewage is taken from its conduit and may be passed first through some kind of screen to eliminate large objects, such as sticks and trash. These may be disposed of in any suitable manner as by burying or incineration or they may be mixed either directly or after comminuting with the solids to be decomposed. In place of this bar screen a comminuter or some other device which reduces large objects to a small size may be used. In the treatment of raw sewage, however, this screening or other similar treatment is usually unnecessary and the material may frequently be passed directly to the next step.

The raw sewage is next placed in a tank or other container and agitated with a suitable amount of the end product from this process to be hereafter described. This end product has highly valuable enzymic properties, as well as adsorbent, absorbent and agglomerant properties, which are utilized here to good advantage. By this treatment some of the colloids are precipitated, the fats and greases are split by certain of the enzymes and the material as a whole is completely deodorized. The biochemical oxygen demand of the raw sewage is reduced about 90% and in some cases as much as 95% in this treatment. I prefer to add an amount of end product substantially equal to the amount of solids in the raw sewage in this step, although satisfactory results may be produced by varying this amount of added end product by 50% either way so long as interfacial contact is provided with all the suspended solids. For example, average raw sewage contains around 99½% water, so that I would add about 50 to 150 grams of end product per 100 gallons of the raw material. Agitation is continued for at least five minutes and preferably for about twenty minutes, although, of course, further agitation of the material may be used. Raw sewage treated in this manner has been stored for several days without producing any obnoxious odors or other noticeable change.

The treated sewage is now placed in a primary sedimentation tank of the usual construction and the solids are allowed to settle. A coagulant, such as "calcoag" which is made up chiefly of ferric salts such as ferric sulfate, may then be added to the effluent and the treated effluent passed into a secondary sedimentation tank. During transfer from one tank to another, and by reason of the exposure of material in these tanks to air, good aeration of the liquid is obtained, so that the resultant water is substantially saturated with oxygen. The primary sedimentation treatment is not necessary but is desirable in that it cuts down on the amount of coagulant needed. The effluent from the secondary sedimentation tank may be passed off directly, although, when this is done, it may be desirable to first chlorinate it. Ordinarily, however, this effluent is first passed through a filter, which may be horizontal, and made up of several sections, containing some of my end product, which has been charred. If the procedure is carried out as described, the resulting water from this filter will be very pure, all suspended solids and dissolved colloids will be removed and it will have a biochemical oxygen demand as low as 5.

The sludge, or separated solids from the settling tanks usually contains about 97% water on the average and is further dewatered in a suitable way. I prefer to use a centrifuge for this purpose because of the ease and speed of thus eliminating water from the solids in the presence of the added end product. The dewatered cake removed from the centrifuge should contain from 40–65% water, preferably less than 50%, and is in a crumbly, spadable condition. The liquid from the centrifuge may be passed into the sedimentation tanks or directly through the char filter.

The dewatered cake from the centrifuge is next placed in a stabilizing chamber, such as is later described, being placed therein in a porous condition and distributed evenly throughout the chamber. The solids are left in this chamber until one cycle of reaction has been completed and are then removed and thoroughly thrashed or flailed in a disintegrator, such as a chain mill, also described below, and then put back into the chamber, or another section thereof, for the second cycle of the decomposition. The end product as it comes from this stabilizing treatment is finely divided and substantially dry to the touch, containing, for example, about 20–22% moisture. This may be used directly as a fertilizer or fill, but is especially adapted, as already mentioned, for the further treatment of raw sewage and other organic wastes. This end product is fully humidified, friable, granular, and free from any putrescible or sticky mucilaginous matter. In this latter respect, the end product may be characterized as non-colloidal or non-gelatinous. The stabilized material is also rich in the various helpful enzymes which tend to split the fats and greases in the raw organic wastes and which assist in the deodorizing of putrified matter. On the other hand this end product does not contain any active thermophilic micro-organisms.

Some of the end product is preferably charred and used in the char filter. It is particularly suited for this purpose because of its high content of relatively coarse, porous, and non-disintegrating activated carbon. During stabilization any cellulose which may be present in the raw material are converted to lignins and lignin like substances. For example, the lignin content in an end product obtained from sewage may vary from 10% to 35% by weight. These lignins and also the various micro-organic mycellium and spores are very valuable in producing an activated carbon of high molecular porosity when the end product is charred. This charred product may be made by heating the end product to a cherry red temperature under non-oxidizing conditions for a suitable period of time. In the use of this charred product as a filter, the first section or two of the filter may become clogged with solids, in which case it may be changed every few days and the used filtering material may then be deposited in the centrifuge or mixed with the sludge and again stabilized. As mentioned above, the charred end product is of a coarse, porous consistency, high in activated carbon which shows no tendency to disintegrate when wetted but on the contrary some tendency to cement. It is an ideal medium for purifying the effluent here because of its properties. This char contains some lime in its natural state which has been calcined and made active during the charring and therefore acts as an adjuster for the pH of water passing through it by reducing any acidity and leaving the filtered water neutral or very slightly alkaline. The charred end product may also be used to advantage in the purifying, clarifying or decolorizing of other liquids and gases.

In my stabilizing treatment I preferably employ a chamber in which conditions may be adjusted and controlled, so that the action of the class of micro-organisms, known as actinomyces, is fostered and the action of other micro-organisms inhibited. These actinomyces are largely facultive aerobic and therefore do not require the constant guaranteed and complete air contact necessary for other types of life. They thrive best at low moisture content and this condition is also favored. Low moisture content also serves to inhibit the growth of fungi and to also inhibit fermentation. During each cycle of the stabilization the rather violent thermophilic reaction of the micro-organisms, present in the raw material being treated, produces substantial increases in temperature, so that all of the material for a considerable period of time is well above the generally accepted pasteurization temperature of 142° F. and in some cases reaches as high as 165° F. It will be apparent, therefore, that after the material has gone through at least two stages of this stabilization, all pathogenic bacteria are killed. As stabilization proceeds, the material loses water by evaporation and by consumption of the micro-organisms, so that the mass is rapidly dried. No addition of lime to the material is necessary since the decomposition is controlled to inhibit acid-forming fermentation reaction.

One modification of a stabilization chamber is shown in Figure 2, in which 10 designates suitable supports for holding the cylindrical chamber 11 well off the floor or base. This chamber is made up of two concentric walls 12 and 13 as shown in Figure 3, which provides an air space 14 therebetween. Exhaust or foul air may pass out through the central duct or exhaust pipe 15. Air reservoirs 16 are provided in the main part of the chamber which connect the outer air space 14 to the exhaust duct 15. These air reservoirs may be put in in staggered or symmetrical relationship, and are preferably evenly dispersed throughout the interior of the chamber to provide uniform distribution of air available to the material to be decomposed. As shown, these reservoirs are triangular in cross section and are of some pervious material such as a fine mesh screening, for example, on the order of 8-20 mesh. The outer shell 12 of the chamber is also provided with suitable ventilators, or openings, throughout its height, as shown at 17, which are provided with gates 17a which may be opened to any desired degree. A suitable cover 18 of sheet metal or other material may be placed over the top of the stabilizing chamber to keep out dust and other foreign material. The bottom of the chamber is preferably provided with a grate, made up of an upper fixed member 19 and a lower sliding member 20 which may be adjusted to open and close the bottom. These grate members are provided with checkered holes corresponding to each other when open, so that material can be shaken down into a suitable container under the chamber. This may be facilitated by a separate shaker mechanism 21 (see Figure 5) having upwardly projecting fingers 22, adapted to be inserted in the holes when the grate is opened. By manually or mechanically agitating the sliding plate and actuating the shaker the material may be shaken down through the grate in even layers, thus lowering the whole bed of material in the stabilizer without changing the contours of the top of said bed. The fingers of the shaker loosen the material adjacent the grates and prevent the clogging of any of the opened holes therein.

As illustrated, the stabilization chamber is divided in halves by a vertical partition 23, extending the full length of the chamber and the grate is divided in two sections to coincide therewith, so that each half of the chamber may be independently used. It is apparent, of course, that this chamber might be split up into three or more sections, or that, on the other hand, two or more separate chambers might be used for different cycles, each without any dividing partition.

It is also within the scope of my invention to use horizontal screens or shelves dividing the container into transverse sections and serving to retain all particles over a given size. A plurality of foraminous endless belt type screens might also be employed arranged to dump the material from one to the other thereby breaking it up from time to time. These belt screens may be arranged in staggered relationship to each other within the chamber, while spaced vertically from each other at a convenient distance, and separated by tray like partitions. Such partitions, however, should be so constructed that they do not interfere with the dumping action of the foraminous belts.

In the operation of the above described stabilizer, a layer about 9-12 inches thick of organic material to be decomposed, which has been treated and dewatered as hereinbefore described, is placed in the body of the stabilizer and spread evenly over the surface of the grate. This may be added manually or by a suitable mechanical spreader. The grate at the bottom of the stabilizer should be closed during the treatment. The top should be put in place after the layer of material is added, and the ventilators adjusted to supply the correct amount of air to the reservoirs. A layer of the material to be treated is preferably added each day, and suitable means may be provided to smooth over the top surface after each addition. After the bottom layer has completed its cycle of thermophilic reaction which ordinarily takes about five days, this layer is extracted by means of the shaker mechanism. Due allowance should be made in the amount of material shaken out for shrinkage due to water losses. The extracted layer is then thoroughly thrashed or flailed in my chain mill, described below, and returned to the next compartment or stabilizing chamber for the next cycle of reaction. During each of these cycles of reaction the temperature rises steadily to a peak and then drops back again to normal thus fostering oxidation and evaporation while helping to inhibit putrefaction and fermentation.

Air in the air reservoirs is available at all times to be utilized in the reaction taking place within the material being decomposed so that it may be drawn out of these reservoirs as needed. The gaseous products of oxidation will rise through the outlet duct due to their specific gravity and the convection currents resulting from the heat generated during the reaction. If a more positive flow of air is required this may be supplied naturally by a chimney, blower, or a suction device attached to the outlet duct, although for normal use this has been found to be unnecessary and it is preferred to merely maintain reservoirs of air available to all parts of the bed of material so that such air can be absorbed as it is needed. Under unusual atmospheric conditions such as very high humidity, it may also be desirable to condition the air supplied to the reservoirs.

The stabilization and/or decomposition may be most satisfactorily carried out as a continuous process. Where the stabilizing chamber is split into two sections as illustrated the procedure may be as follows: A few inches of finished end product are taken out at the bottom of the second cycle half for charring and treating raw sewage. A slightly larger amount is shaken down from the first cycle half, thoroughly thrashed and disintegrated in the chain mill, and spread evenly in the top of the second cycle half. In the meantime the raw sewage is being continuously deodorized and dewatered and a layer of about a foot depth is placed in the top of the first cycle half, in as porous and crumbly a condition as is feasible. The next day this series of steps is repeated.

For carrying out the above mentioned disintegration or thrashing, I have found that a chain mill, such as shown in Figures 6 and 7, is satisfactory. This chain mill may consist of a retaining wall 30 in which is placed, either fixedly or simply resting on the ends of said wall, a bin 31 of a cross section, as shown in Figure 7. This bin or hopper may include a horizontal cylindrical portion 32, having openings 33 around the bottom portion thereof for the discharge of thrashed material, and which is connected to the superimposed hopper shaped sides 34. A shaft 37 journalled in bearings 35 and 36 in the ends of said cylindrical member, is adapted to be rotated at high speeds by a motor 38. This shaft 37 is preferably provided with suitable sectons of chain 39 fixed to the shaft in somewhat staggered and offset relationship, so that they will extend substantially to the walls of the cylinder 32 when the shaft is rotated. The material to be disintegrated is dumped into the hopper 34 and falls down upon the revolving shaft and chain links where it is completely broken up and flailed so that all of the particles are at least as small as 8 mesh.

By this construction, damage to the machine is prevented in the event that larger objects get in with the material being stabilized, because the chains are flexible and will be deflected upon striking such object. Other means for disintegrating the material, of course, may be used in place of that described herein.

Figures 8 and 9 illustrate another embodiment of an apparatus adapted to stabilize the solids being treated. This stabilizer is preferably of rectangular shape in horizontal and vertical cross section and is made up of an outer shell 12' and an inner shell 13', forming an air space 14' similar to the cylindrical chamber. A longitudinally extending central exhaust duct 15' serves to divide the chamber in halves and to remove exhaust gas similarly to the other modification. Staggered air reservoirs 16' are also used to aerate the material and are connected to the fresh air space 14' and exhaust duct 15'. These reservoirs are similar in construction and function to the reservoirs 16 already described. Suitable covers 18' are provided at the top and grate members 19' and 20' are used at the bottom as in the other embodiment. These grate members open into hoppers 50 arranged below them, which have a downwardly curved portion at their bottom 51 carrying suitable helicoid conveyors 52 and 52a. As the material is shaken down through the grate these conveyors are brought into use to move the material longitudinally of the chamber. Material from conveyor 52 on one side of the stabilizing chamber is received by the hopper portion of a chain mill 53, of construction similar to that already described. The material is then thrashed or disintegrated and drops down into another helicoid conveyor 54, which carries it to the pocket 55. A suitable bucket conveyor 56, or other means may be used to lift the material out of this pocket and carry it to the top of the stabilizer, where it is dropped into the next chamber thereof, through the swiveled chute 57 or other suitable distributing means. Material from the conveyor 52a may be carried away and used as stabilized end product. It is apparent, of course, that this stabilizing chamber may be also split up into any number of sections, vertical and/or horizontal, as mentioned with respect to Figure 2. This device is preferably operated similarly to the embodiment shown in Figure 2 already described.

In the use of my stabilizing apparatus, it is a very simple matter to keep ample quantities of fresh air available to all parts of the material without flowing actual currents of air through such material. In other words, by simply regulating the slides 17a and a damper in the duct 15, if such is provided, sufficient air may be made readily available to prevent anaerobic action and to induce aerobic action to its maximum degree.

In one embodiment of my invention it has been found that five days decomposition of the material, followed by treatment in the chain mill, and another five days of decomposition or stabilization, is very satisfactory, although it is perfectly possible to vary the time length of each cycle or the number of cycles. The disintegration of the material after each cycle is extremely helpful in obtaining complete stabilization, because a porous condition is more easily engendered in the material, a secondary thermophilic reaction of lesser intensity and shorter duration is stimulated and the actinomyces are enabled to function throughout each particle.

In the ordinary biological or biochemical decomposition of material such as sewage, it has been extremely difficult heretofore to obtain this complete stabilization because the particles will contain a certain amount of putrescible matter at their center while the surface thereof may be stabilized. This difficulty is completely overcome in my process.

The above order of carrying out the steps of the process is preferred but may be varied; the process is also well adapted to be combined with present day processes in commercial use. For example, ordinary sewage sludge or sludge from any separation process, such as the activated sludge or precipitated sludge methods, may be decomposed by first mixing therewith a sufficient amount of my end product to take care of the solids in such sludge. That is, the amount of end product added is preferably about the same weight as that of the solids contained in such sludge, although this may vary 50% either way. This treated sludge may then be dewatered, as by placing in a centrifuge and whirling at high speeds to obtain a cake of less than 60% average water content and preferably less than 50%. Even when treatments of this type are carried out it will be found in a very short period of time, and at least by the time the dewatering is complete, that both the dewatered cake and the effluent therefrom are completely deodorized. All traces of foul and obnoxious odors are eliminated and the material is left with a slight odor of freshly turned earth. This dewatered cake may then be treated to stabilize it as already described.

It is manifest, of course, that partially decomposed organic matter may be treated similarly to raw material. It is also important that the material going into the stabilizing chamber should not have a water content higher than 65%, and it is preferable to have a water content of about 50% because if the water content is too high it is substantially impossible to maintain the material in a sufficiently porous condition to prevent anaerobic action.

By the term "end product" is meant the finely divided product resulting from the controlled decomposition of organic putrescible waste according to the process of this invention which is substantially free from putrescible matter and pathogenic bacteria and is substantially dry in appearance.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. Stabilized organic waste material produced by treating wet raw waste with some of the stabilized organic waste material, dewatering the treated material, and subjecting the dewatered material in the form of a porous bed in a container to a controlled aerobic thermophilic decomposition by means of air reservoirs interspersed throughout said porous bed.

2. Substantially dry non-colloidal stabilized organic waste obtained by subjecting moist putrescible organic waste containing not more than about 65% water to cycles of aerobic decomposition by thermophilic bacteria while maintaining the material porous and exposed to aeration, and thrashing the partly stabilized material between cycles of the thermophilic decomposition to expose undecomposed putrescible matter and stimulate reaction in the next cycle.

3. Stabilized organic waste material produced by treating sewage solids with some of the stabilized material, dewatering the treated sewage solids to a water content of not more than about 65%, and subjecting the dewatered material in the form of a porous bed in a container to controlled cycles of aerobic thermophilic decomposition while maintaining the material porous and exposed to aeration, said stabilized material being substantially dry and non-colloidal in character and having marked absorbent, agglomerant and deodorizing properties.

4. In the method of treating putrescible organic material to decompose and stabilize the same, the steps of placing the said material in the form of a porous bed in a substantially closed container and maintaining air reservoirs extending into the interior of the bed interspersed throughout said porous bed to control the decomposition thereof.

5. A method as defined in claim 4 in which the porous bed is moist and the material is broken up at least once before it is completely decomposed.

6. A method as defined in claim 4 in which the organic material is sewage material and the porous bed thereof is adjusted to a moisture content less than about 65% at the beginning of the controlled decomposition.

7. The process of stabilizing decomposable organic material comprising controlling the decomposition under conditions of oxygen supply and temperature favorable to the growth of actinomyces and thermophilic bacteria, and thrashing said material at least once after said material has partially decomposed to disintegrate and break up particles containing putrescible and undecomposed matter.

8. The process of stabilizing material containing organic wastes comprising treating the same with stabilized end product, dewatering the treated material to at least a spadable condition, subjecting the material to cycles of bacterial decomposition while maintaining the material porous and subjecting it to aeration, and removing the partly stabilized material between cycles and thrashing it to expose undecomposed putrescible matter and stimulate reaction in the next cycle.

9. The process of stabilizing material containing organic wastes comprising treating the same with stabilized end product, lowering the water content of the material to at least about 65%, subjecting the material to cycles of decomposition by thermophile bacteria while maintaining the material porous and subjecting it to aeration, and removing the partly stabilized material between cycles and thrashing it to expose undecomposed putrescible matter and stimulate reaction in the next cycle.

10. The method of treating decomposable organic material comprising treating a water suspension of said material with finely divided stabilized organic material, dewatering said treated material, placing the dewatered material in the form of a porous bed in a container, and maintaining air reservoirs interspersed throughout said porous bed to control the decomposition thereof.

11. The method defined in claim 10 wherein the decomposed material is used to treat a fresh batch of raw organic material.

12. The method of treating putrescible organic waste comprising decomposing a portion of said material to a substantially dry finely divided condition by thermophilic bacteria, mixing a substantial quantity of said decomposed material with said putrescible organic waste, placing said mixture in a moist condition but containing less than 65% water in a porous bed, and subjecting said bed to cycles of decomposition by thermophilic bacteria while supplying air thereto.

13. The method of treating putrescible organic waste comprising decomposing a portion of said material to a substantially dry finely divided condition by thermophilic bacteria, mixing a substantial quantity of said decomposed material with said putrescible organic waste, placing said mixture in a moist condition but containing less than 65% water in a porous bed, subjecting said bed to cycles of decomposition by thermophilic bacteria in the presence of air, and disintegrating the material of said bed between cycles to expose any putrescible undecomposed matter.

GEORGE H. ROEDER.